United States Patent [19]

Haines

[11] Patent Number: 5,469,469
[45] Date of Patent: Nov. 21, 1995

[54] COMPOSITE SPREAD SPECTRUM SIGNAL INCLUDING MODULATOR DEMODULATOR

[75] Inventor: D. Mark Haines, Littleton, Mass.

[73] Assignee: University of Massachusetts Lowell Research Foundation, Lowell, Mass.

[21] Appl. No.: 163,161

[22] Filed: Dec. 7, 1993

[51] Int. Cl.[6] ................................................ H04B 1/69
[52] U.S. Cl. ....................................... 375/201; 380/33
[58] Field of Search ........................... 375/1, 201; 380/33

[56] References Cited

U.S. PATENT DOCUMENTS

| | | | |
|---|---|---|---|
| 4,901,307 | 2/1990 | Gilhousen et al. | 375/1 |
| 4,984,247 | 1/1991 | Kaufman et al. | 375/1 |
| 5,031,192 | 7/1991 | Clark | 375/1 |
| 5,103,459 | 4/1992 | Gilhousen et al. | 375/1 |
| 5,157,686 | 10/1992 | Omura et al. | 375/1 |
| 5,157,688 | 10/1992 | Dell-Imagine | 375/1 |
| 5,159,607 | 10/1992 | Read | 375/1 |
| 5,193,094 | 3/1993 | Viterbi | 371/43 |
| 5,210,770 | 5/1993 | Rice | 375/1 |
| 5,228,054 | 7/1993 | Rueth et al. | 375/1 |
| 5,268,926 | 12/1993 | Sebilet | 375/1 |
| 5,291,475 | 3/1994 | Bruckert | 375/1 |
| 5,311,541 | 5/1994 | Sanderford, Jr. | 375/1 |
| 5,357,541 | 10/1994 | Cowart | 375/1 |
| 5,363,461 | 11/1994 | Lucas et al. | 375/1 |

OTHER PUBLICATIONS

Pickholtz, R. L., et al., "Spread Spectrum for Mobile Communications", *IEEE Trans. on Vehicular Technology*, 40(2): 313–321 (May 1991).

Sarwate, D. V. and Pursley, M. B., "Crosscorrelation Properties of Pseudorandom and Related Sequences," *Proc. IEEE*, 68(5): 593–619 (May 1980).

Vernier, G., "A Simplified Matched Filter for Large–Time–Bandwidth Sounders", Proc of 2nd Conference on HF Communication Systems and Techniques, *Electronics Division of the IEE*, London, 15–17 (Feb. 1982).

Melancon, P., "Development of a Fast Sampling System for Estimation of Impulse Responses of Mobile Radio Channels", *Communications Research Centre*, pp. 23/1–23/6, Ontario, Canada.

Anderson, J. B. and Sundberg, C. W., "Advances in Constant Envelope Coded Modulation", *IEEE Comm. Magazine*, pp. 36–45 (Dec. 1991).

Ungerboeck, G., "Trellis–Coded Modulation with Redundant Signal Sets", *IEEE Comm. Magazine*, 25(2): 5–11 (Feb. 1987).

Ungerboeck, G., "Channel Coding with Multilevel/Phase Signals", *IEEE Trans. on Info. Theory*, IT–28(1):55–67 (Jan. 1982).

Pietrobon, S. S. et al, "Trellis–Coded Multidimensional Phase Modulation", *IEEE Trans. of Info. Theory*, IT–36(1):63–89 (Jan. 1990).

Cooper, G. R. and Nettleton, R., "A Spread–Spectrum Technique for High Capability Mobile Communications", *IEEE Trans. Vehicular Technology*, VT–27:264–75 (Nov. 1978).

R. A. Scholtz, et al., "Optimal CDMA Codes," 1979 *National Telecommunications Conf. Record*, Washington D.C., 1514(9):54.2.1–54.2.4 (Nov. 1979).

(List continued on next page.)

*Primary Examiner*—Salvatore Cangialosi
*Attorney, Agent, or Firm*—Hamilton, Brook, Smith & Reynolds

[57] ABSTRACT

A composite spread spectrum signal including modulator and demodulator therefor is disclosed. The composite signal having a multi-dimensional signal space, comprising a pulse position modulation dimension generated by varying starting positions of cyclically repeated chipping sequences, a frequency shift key dimension generated by varying a carrier frequency between a plurality of frequencies, code shift keyed dimensions generated by selecting the chipping sequences from among a plurality of orthogonal sequences, and amplitude shift key dimensions generated by selecting amplitudes of each subcarrier for each message bundle. This signal may further comprise a phase shift key dimension generated by assigning a phase relationship of the orthogonal subcarriers.

32 Claims, 13 Drawing Sheets

OTHER PUBLICATIONS

J. Salz, et al., "Data Transmission by Combined AM and PM," *The Bell Systems Technical Journal,* 50(7):2399–2419 (Sep. 1971).

M. K. Simon, et al., "Hexagonal Multiple Phase–and–Amplitude–Shift Keyed Signal Sets," *IEEE Transactions on Communications,* 21(10):1108–1114 (Oct. 1973).

R. Gold, "Optimal Binary Sequences for Spread Spectrum Multiplexing," *IEEE Transactions on Information Theory,* pp. 619–621 (Oct. 1967).

H. Ochsner, "Direct–Sequence Spread–Spectrum Receiver for Communication on Frequency–Selective Fading Channels," IEEE Journal on Selected Areas in Communications, 5(2):188–193 (Feb. 1987).

T. Kasami, "Weight Distribution Formula for Some Class of Cyclic Codes," (Report No. R–285) University of Illinois, Urbana, Ill., (Apr. 1966).

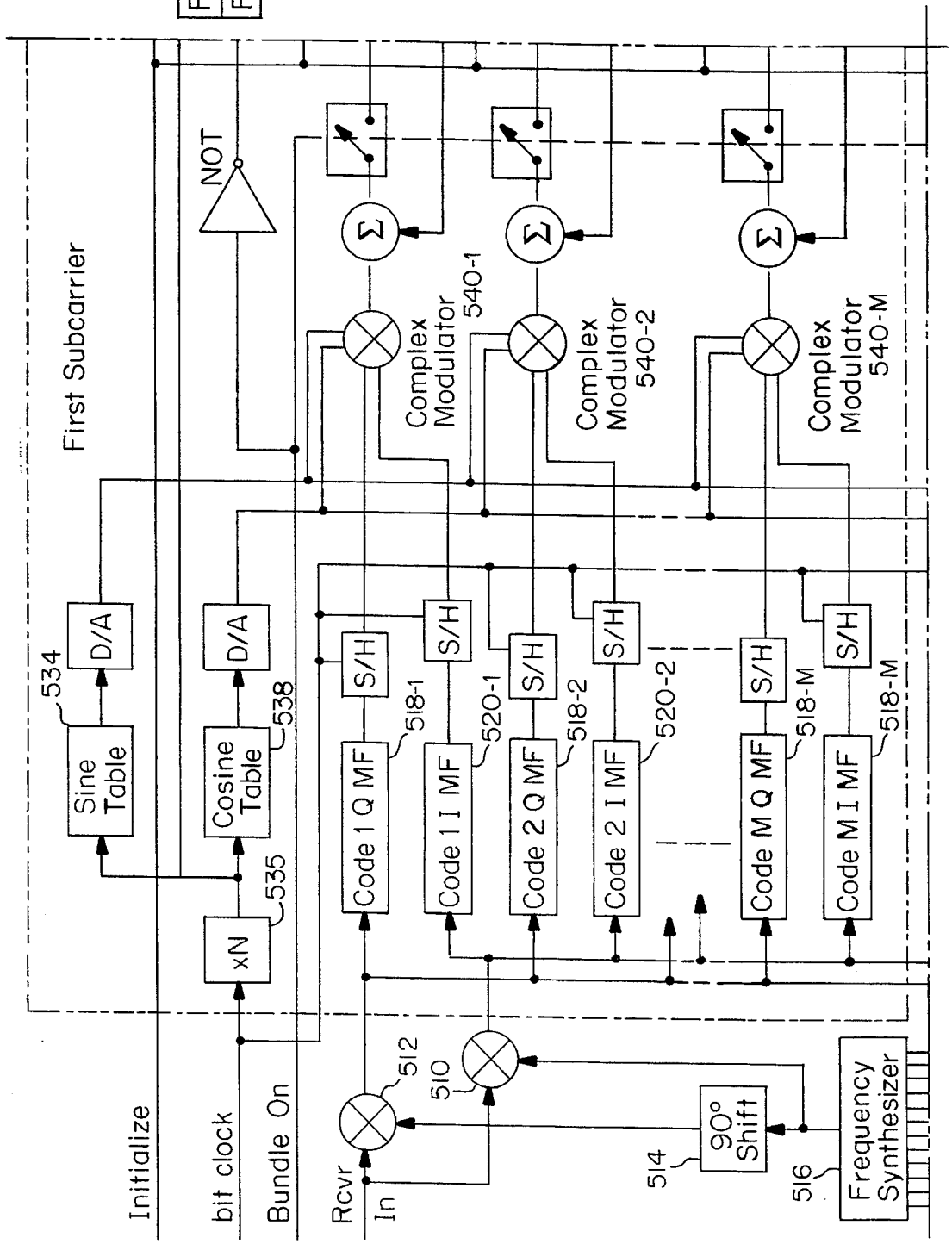

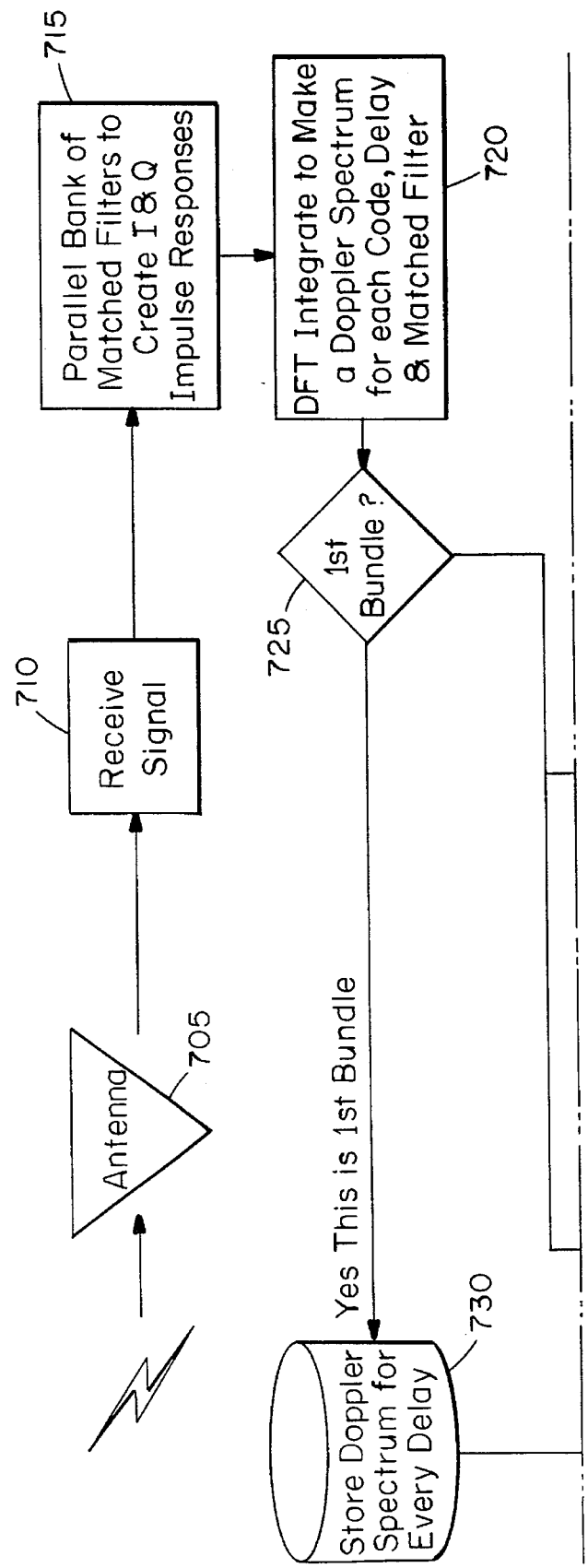

COMPOSITE SPREAD SPECTRUM SIGNAL INCLUDING MODULATOR DEMODULATOR

BACKGROUND OF THE INVENTION

Spread-Spectrum refers to a broad class of modulation techniques in which a bandwidth of a carrier is enlarged beyond that necessary to convey the information to be transmitted. One technique for "spreading" the carrier signal is to replace each bit of the original message, with a determinate pseudo-random sequence of one's and zero's commonly known as a chipping sequence and then bi-phase or phase-reversal modulate the carrier signal in response to the sequence. As a result, a pattern of ten or possibly hundreds of bits of the chipping sequence may represent one or only a few bits of the original message. The sets of chipping sequences are generally mathematically orthogonal code patterns known by both the transmitter and receiver or generated by identical key generators seeded with the same predetermined value. The use of matched filters enables the receiver to enhance the signal upon reception thus allowing recovery of the signal-to-noise ratio (SNR) lost because of the increased bandwidth of the spread spectrum transmission.

The redundancy inherently present in spread spectrum modulation lowers channel information capacity, which tends to restrict useful applications due to its consumption of such large portions of the frequency spectrum while not conveying any more information. The information capacity limitation is further compounded in severely time dispersive channels.

SUMMARY OF THE INVENTION

The present invention concerns a composite spread-spectrum modulated signal having a multi-dimensional signal space, comprising:

a pulse position modulation dimension generated by varying starting positions of cyclically repeated chipping sequences;

a frequency shift key dimension generated by varying a carrier frequency between a plurality of frequency offsets; and a code shift keyed dimension generated by selecting between a plurality of different chipping sequences.

This signal may further comprise a phase shift key dimension generated by assigning a phase relationship of the subcarriers.

The present invention also concerns a modulator for generating a composite signal, the modulator comprising:

a sinusoidal signal generator for generating a carrier signal being temporally divided into message bundles;

a modulating section for linearly modulating the carrier signal with a chipping sequence, information being encoded into the carrier signal by selecting a start bit among the bits comprising the chipping sequence for each message bundle; and a section for modulating a frequency of the carrier signal.

Also the present invention concerns a demodulator for demodulating the composite signal, the demodulator comprising:

a filter for cross correlating a received chip sequence with a plurality of possible chip sequences each beginning at a predetermined bit;

a comparator for determining to which one of said plurality of possible chip sequences said received chip sequence corresponds;

a means for determining a time lag until a correlation peak is generated by said cross correlating means; and a decoder for decoding said time lag and said received chip sequence as transmitted data.

The above and other features of the invention including various novel details of construction and combinations of parts will now be more particularly described with reference to the accompanying drawing and pointed out in the claims. It will be understood that the particular composite signal, modulator, and demodulator embodying the invention is shown by way of illustration only and not as a limitation of the invention. The principles and features of this invention may be employed in various and numerous embodiments without departing from the scope of the invention.

BRIEF DESCRIPTION OF THE DRAWINGS

FIG. 1 illustrates a time domain representation of chipping sequences used to modulate the subcarriers of the composite signal;

DETAILED DESCRIPTION OF THE INVENTION

Figure 2:
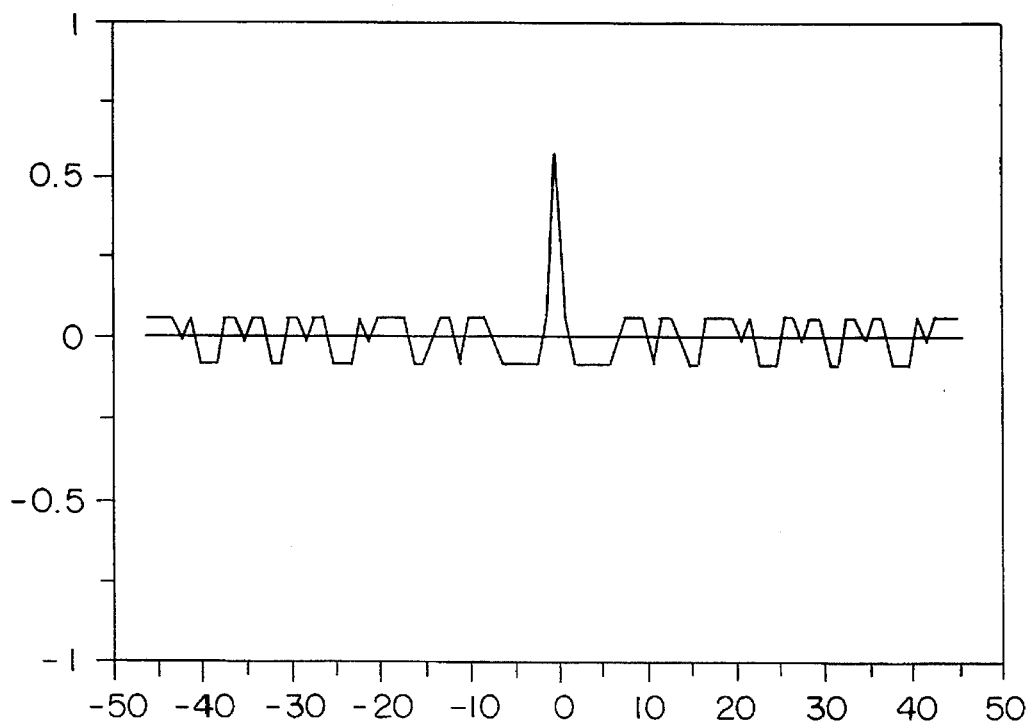
FIG. 2 illustrates the auto correlation function of the 63 bit Kasami sequence.

Turning now to the figures, a composite signal constructed according to the principles of the present invention is described.

The inventive composite signal utilizes a combination of four modulation schemes and multiple subcarriers yielding a multi-dimensional signal space. Briefly, the composite signal includes two independent subcarriers in phase-quadrature. Each of these subcarriers are spread spectrum modulated in two dimensions by selecting first the chipping sequence (code shift key modulation) for each message bundle and then by selecting a start bit in a cyclic and repeated transmission of the selected chip sequence for each message bundle. Since shifting the starting point in the cyclic code results in a corresponding shift in the position of the received correlation peak this constitutes pulse position modulation. An additional dimension is provided by making a slight shift in the frequency of the sub-carriers (frequency shift key modulation), another dimension is provided by selecting from a plurality of possible amplitudes, and a final dimension is generated by modulating the phase relationship between the quadrature subcarriers. Each of these dimensions will be discussed in detail below.

Code Shift Key Modulation

Each subcarrier is assigned a unique set of orthogonal chipping sequences. Specifically, the first subcarrier is assigned the first eight of the sixteen orthogonal 255 bit Kasami sequences, identified for the purposes of this description as the set-1 sequences. The second subcarrier is assigned the remaining eight Kasami sequences, the set-2 sequences. Then, for every message bundle, each subcarrier is bi-phase modulated by one of the Kasami sequences in its assigned set which are selected in response to the information to be transmitted. Since any one of eight different Kasami sequences may be selected for each subcarrier for each message bundle, three bits may be encoded into each subcarrier making six CSK bits in each message bundle.

Although the present embodiment utilizes bi-phase modulation of the subcarriers by the Kasami sequences, any form of modulation that provides linear detection at the receiver could be used. For example, such linear modulation techniques as: minimum shift key modulation, amplitude modulation, frequency shift key modulation, and continuous phase modulation represent a few alternative techniques that would satisfy the criterion.

Figures 1, 1A, 1B:
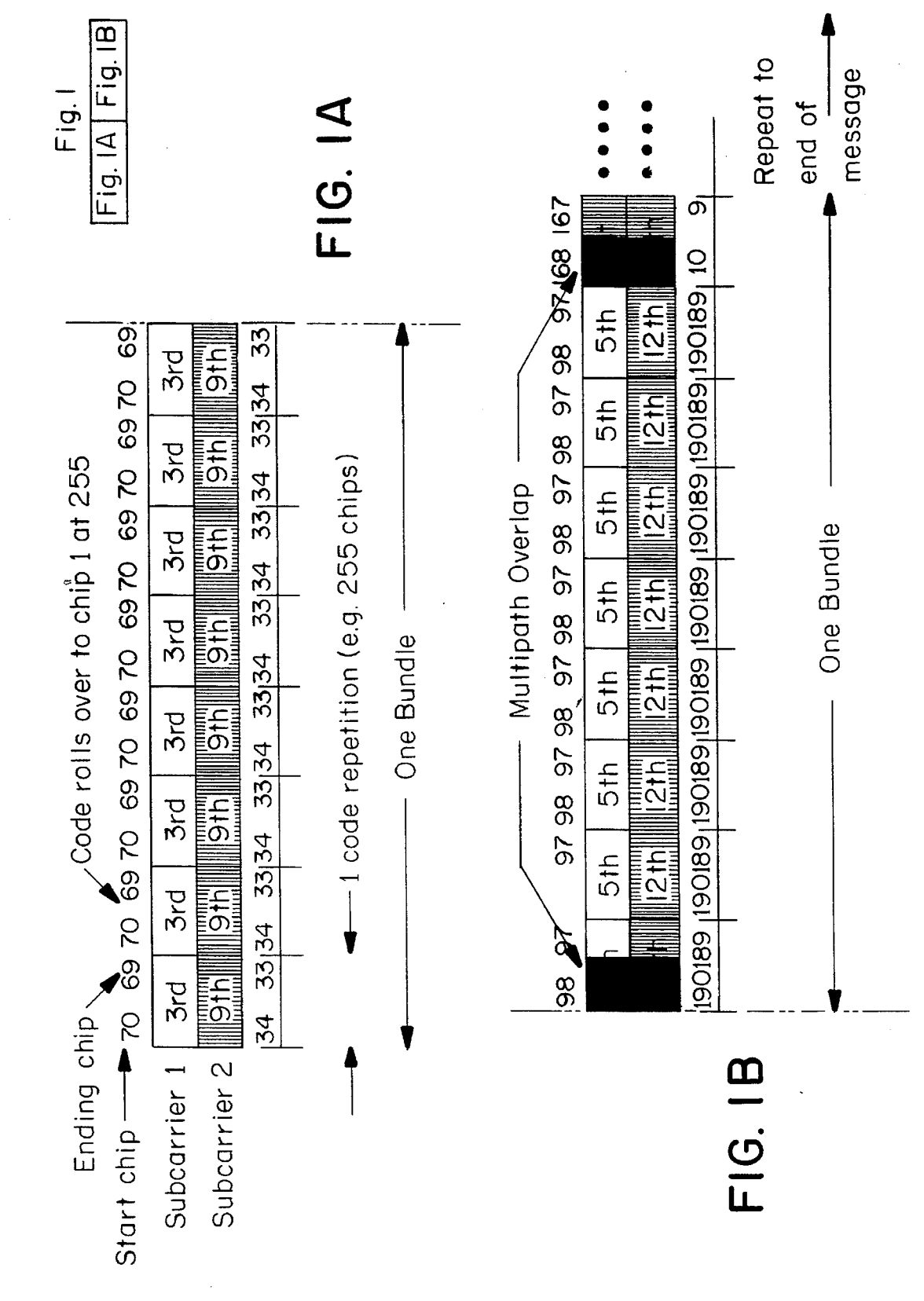

Each message bundle lasts long enough to accommodate N (e.g. eight) repetitions of the same selected Kasami sequence. Normally, the number of code repetitions will be a power of 2 to facilitate the fast Fourier transform spectral analysis enabling frequency shift key demodulation. FIG. 1 illustrates a time domain representation of exemplary chipping sequences used to modulate each subcarrier for two full message bundles plus the beginning of a third. The first subcarrier is consecutively modulated by the third, fifth, and first Kasami sequences selected among the first through eighth set-1 Kasami sequences assigned to that subcarrier; each block labeled "3rd," for example, represents one repetition of the third 255-bit Kasami sequence yielding a total of N or eight, full repetitions per message bundle. The second subcarrier is modulated by sequences selected from the ninth through sixteenth set-2 Kasami codes, i.e., the ninth, twelfth, and fifteenth.

Although other pseudo-random sequences could be used, the Kasami sequences minimize Welch bounded leakage from one of the sequences to another. Further, the Kasami sequences maintain their ideal autocorrelation function regardless of a start bit when the sequences are cyclically repeated.

Pulse Position Modulation

Each subcarrier is also pulse-position modulated by selecting the start bit in the modulating Kasami sequence for each message bundle. Seven bits can be encoded by selectively beginning the modulation of the subcarrier at one of 128 bits in the 255 bits of the selected Kasami sequence. 255 start positions could be defined but it is more reliable to have a one-shift guard band since in general, signal delays will fall between the exact centers of the time delay resolution cells. Since the demodulator can identify the selected Kasami code independently of the bit on which the transmission was started, the pulse position modulation does not affect the code shift keyed modulation. A total of 14 bits are encoded using the pulse position modulation, seven for each subcarrier.

FIG. 1 also illustrates the pulse position modulation by which, during the first message bundle, the first subcarrier is repetitively modulated by the third Kasami sequence beginning at the 70th bit. The first repetition of the code progresses through code bit then rolls over to 1 and continues to code bit 69 constituting a single repetition. Immediately after the 69th bit of the first repetition, the code bit 70 follows thereby starting the second repetition. The message bundle ends with the 69th bit of the third Kasami sequence, that is to say, exactly 8 repetitions are generated to ensure that the message bundle has a fixed temporal length so that the receiver can maintain synchronization. Then, to encode the second bundle, the first subcarrier is modulated by the fifth Kasami sequence beginning at the 98th bit. The second subcarrier is similarly pulse position modulated by starting with the 34th bit of 9th Kasami sequence during the first message bundle and the 190th bit during the second bundle.

Figure 9:
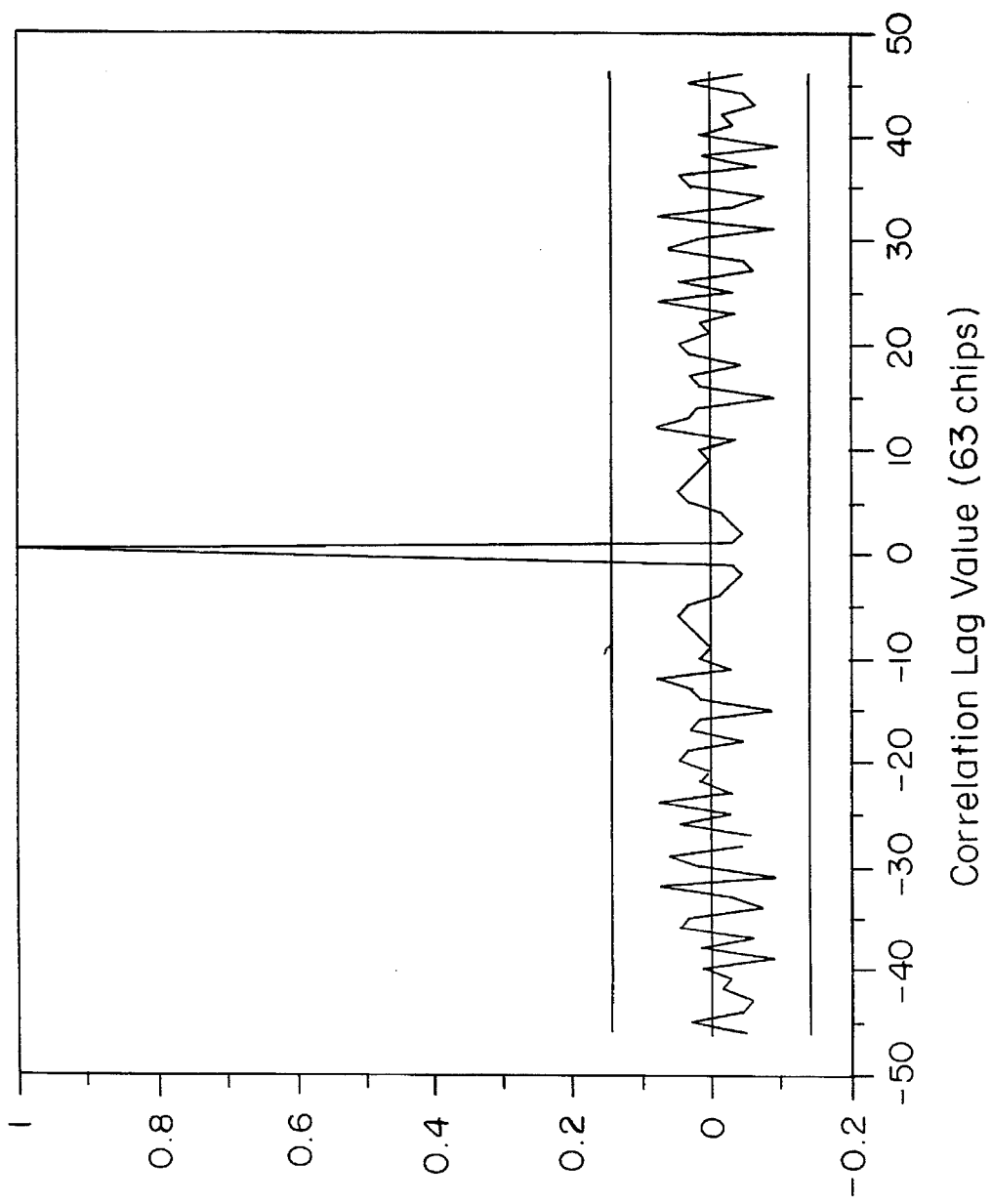
FIG. 9 illustrates a non-optimal correlation resulting from a receiver's failure to synchronize on the beginning of a sequence repetition.

The attractive property of the Kasami sequence is their auto correlation functions illustrated in FIG. 2 for a 63 bit Kasami sequence. This ideal (Welch Bounded, see Proakis, J., *Digital Communications*, Ch. 8, McGraw Hill, 1983) correlation is obtainable at the receiver only if it can be synchronized to begin sampling the instant the message bundle starts to arrive. However, if time of arrival uncertainties result in sampling before the arrival or after the termination of the code sequence, a correlation more like the function illustrated in FIG. 9 will result. Time of arrival uncertainties can be compensated for by sampling the end of a preceding repetition of the same code or into the next repetition of a subsequent identical code. This will maintain the ideal characteristics of FIG. 2.

If time dispersion or multipaths, are present in the propagation medium, a receiver can not synchronize with the beginning of the message bundle for all multipaths, simultaneously. Therefore, the transmitter must cycle through the selected Kasami sequences a second time for at least as long as the maximum expected multipath delay. For instance, if one sequence repetition takes 8.5 msec and the maximum anticipated time dispersion over the channel is 5 msec, then one sequence plus 5 msec into the second repetition must be transmitted to ensure that all multipath components are present at the receiver for demodulation. Since the composite signal cycles through the modulating Kasami sequence N times, for instance, eight times, a single repetition being longer than the largest expected multipath delay, the presence of all multipath components at the receiver is ensured by the time the second repetition starts to arrive.

The composite signal is also adapted to perform in environments containing multipath by the provision of a dead time during multipath overlap between each message bundle. A dead time is selected to exceed the longest multipath delay in the environment, for instance greater than 5 msec, allowing the message bundle via all of multipaths to terminate before the receiver begins to receive the next message bundle. Therefore, the receiver can begin decoding the next message bundle without interference from the last bundle received via the longest multipath. Since the sequence length and the dead time both must be longer than the largest multipath delay, they could both be made the same period (e.g. 8.5 ms). Therefore, the dead time can be neatly incorporated into the first repetition of each subsequent message bundle by the following means. Since most time domain window functions (used to condition data for a Fourier transform) such as a Hanning window are zero at one point we can make this zero weight coincide with the first code repetition, thus eliminating all samples from the first repetition and therefore multipath contamination. This results in the continuous transmission illustrated in FIG. 1.

Frequency Shift Keyed Modulation

The first and second subcarriers are also collectively frequency shift keyed modulated to one of four frequencies for each message bundle. Therefore, an additional two bits can be encoded by selection of the frequency shift in the composite signal.

The frequency shift key modulation of the two subcarriers may appear to complicate the demodulation. On many channels of interest, however, a Doppler shift of an unknown magnitude will continuously change the phase of the carrier during transmission. The multiple samples of each repetition of the Kasami sequence can be integrated only if the carrier is coherent from one repetition to the next. Therefore, in a channel in which a Doppler shift may be present, the signal integration must be performed by a full spectral integration such as a Fourier transform. This is generally called Doppler processing or Doppler integration.

Since the signal should be analyzed by the full spectral integration simply to maintain coherence, information can be transmitted at "no extra cost" by artificially inducing a "Doppler shift" by offsetting the transmitter by a frequency corresponding to 1,2 . . . . N Doppler bins of the receiver. This typically corresponds to a few Hz or 10's of Hz. Here, four or N/2 frequency offsets rather than eight were selected to limit the frequency offset and thereby avoid decorrelating the waveform. Therefore, two bits of information can be transmitted by moving the position of the peak in the received Doppler spectrum to any of the N/2 Doppler bins.

Since an actual Doppler shift may already be present on the channel, the information encoded by the frequency shift key modulation is best encoded differentially, using the previous message bundle as a reference for the next. The Doppler spectrum is inherently circular, in that any signal that exceeds the positive limit of the spectrum appears at the negative extreme, i.e. wraps around. Therefore, regardless of the current position of the Doppler peak, any shift of 0 through N can be made on the next message symbol without running off the edge of the Doppler spectrum.

As was explained above for pulse position modulation, the Doppler spectrum may not contain just a single peak, each multipath component may exhibit a different Doppler shift, therefore, the differential shift carrying the message information may only be detectable by cross-correlating it with the Doppler spectrum from the previous message symbol. Note however, that most multipath components are isolated by the range, that is, time delay, resolution of the pulse compression technique, which occurs prior to the computation of the Doppler spectrum. Therefore, there will be only one or a few Doppler peaks per time delay bin in all but the most disturbed propagation environments.

Amplitude Shift Key Modulation (ASK)

Selection of the transmitted signal amplitude from a plurality of possible amplitudes can provide more information capacity. This can be provided by placing a digitally controlled attenuator or variable gain amplifier in each subcarrier channel prior to the summation of the two subcarriers. Like the other modulation dimensions, the level is most reliably detected differentially by comparing it to the level of the signal during the preceding message bundle rather than against some absolute standard. Four levels per subcarrier would allow two bits of information to be encoded on each for a total of four additional bits per message bundle.

Implementation of the amplitude shift key dimensions should be avoided for communications links exhibiting complicated fading or high noise.

Phase Shift Key Modulation

During quadrature modulation, the phase of one of the subcarriers is advanced by ninety degrees relative to the other one. At demodulation, the two subcarriers are distinguishable by their assigned Kasami codes. Therefore, one final bit can be encoded by controlling whether the phase of the first subcarrier leads or lags the phase of the second subcarrier by ninety degrees for each message bundle.

Figure 3:
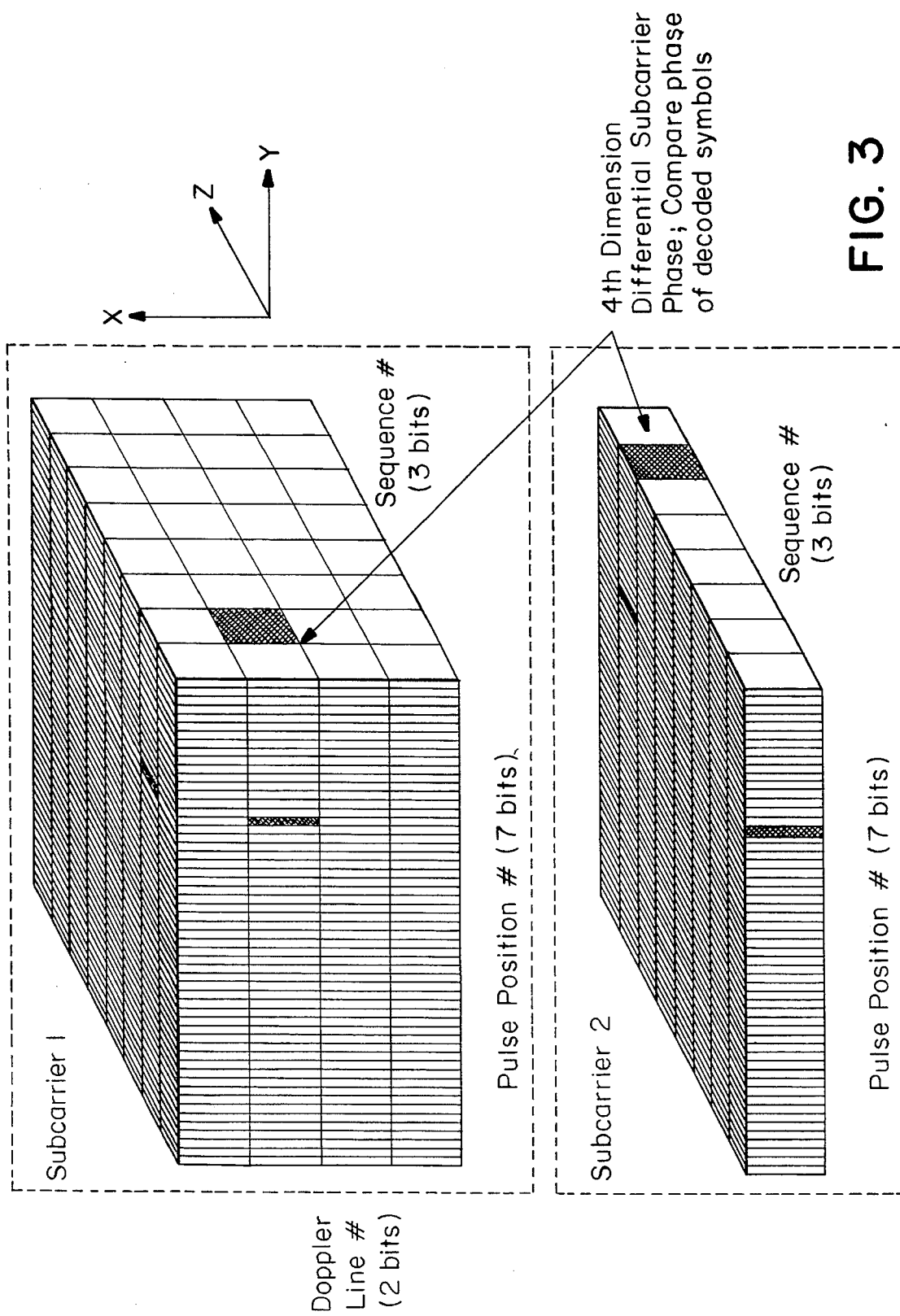
FIG. 3 illustrates the signal space dimensions of subcarriers of the composite signal.

FIG. 3 illustrates the multidimensional signal space for each subcarrier of the composite signal. In our example, each subcarrier defines one of 4096 possible message bundles, eight possible Kasami sequences represented by the eight divisions along the z-axis, 128 pulse positions indicated by the 128 divisions along the y-axis, and four frequency shifts into the available Doppler bins designated by the four divisions along the x-axis, totaling 12 bits in a three dimensional signal space. The other subcarrier only adds 10 bits since the frequency shifts cannot be independently selected for each subcarrier, or the signal envelope would then "beat" causing an amplitude modulation. Finally, the modulation of the phase relationship of the two subcarriers in the quadrature modulation adds another bit, yielding a message bundle of 23 bits. The 4 bits provided by the amplitude modulation are not shown because of the difficulty in illustrating the additional dimensions.

In summary, by utilizing two orthogonal sets of 8 (16 total) 255 length chipping sequences, repeated 8 times, there are 8 bit fields in the 27-bit input data word, 1. FSK, 2-bits for the frequency offset selection;

2. CSK, 3-bits for selection of an orthogonal spreading code from set-1;

3. PPM, 7-bits for the rotation of the set-1 code's starting position;

4. ASK, 2-bits for selection of signal amplitude for the first subcarrier;

5. CSK, 3-bits for selection of a set-2 code;

6. PPM, 7-bits for the rotation of the set-2 code;

7. ASK, 2-bits for selection of the signal amplitude for the second subcarrier; and 8. Differential PSK, 1-bit for the first subcarrier phase relative to the second subcarrier (+90 or −90°).

Modulator

Figure 4:
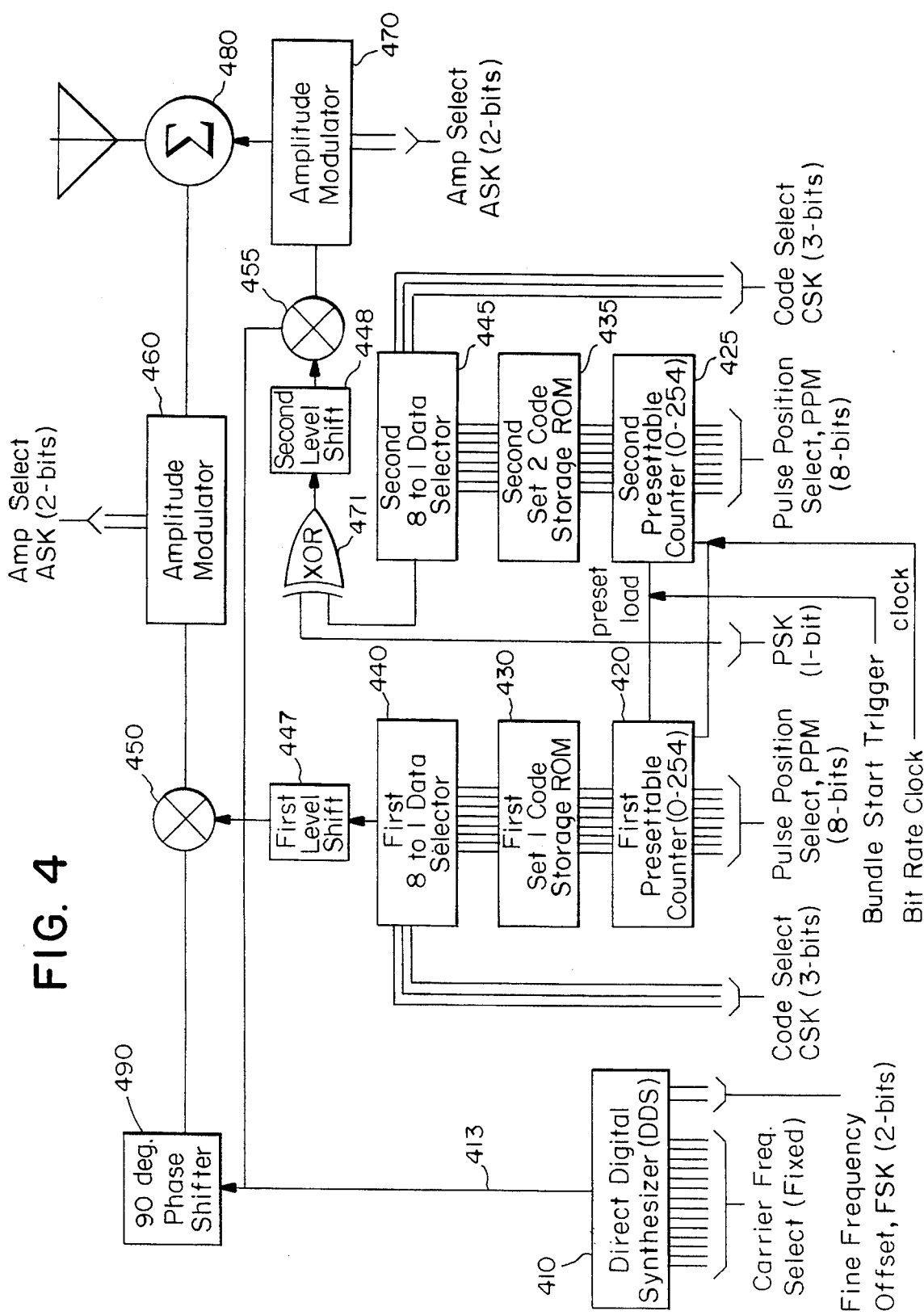
FIG. 4 is a schematic diagram of a modulator for manufacturing the composite signal.

FIG. 4 illustrates an inventive modulator for manufacturing the above-described composite signal. More specifically, a direct digital synthesizer 410 receives two bits of data on line 411 every message bundle period and generates a sinusoidal signal on output line 413 having one of four frequency offsets determined by the two bits; the remaining fourteen frequency selection terminals labelled "carrier frequency select (fixed)" are fixed to select the overall frequency of the carrier. The sinusoidal signal generated by the synthesizer 410 is the second subcarrier. The first subcarrier is generated by advancing the phase of the second subcarrier by ninety degrees in the 90 degree phase shifter 490.

A first presettable counter 420 receives seven bits defining the bit on which the chipping sequence for the first subcarrier will start, thus comprising the pulse position modulation. These seven bits are loaded into the counter's register in response to a message bundle start trigger signal received at a preset/load terminal of the counter 420. Upon receipt of this signal, the presettable counter 420 initiates counting up for every cycle of the bit rate clock.

The count generated by the presettable counter 420 is used to address a code storage Read-Only-Memory 430 storing the eight set-1 Kasami sequences. The first code storage ROM 430 stores, at each address, the corresponding bits of each set-1 Kasami sequence. For example, address 28 holds the twenty-eighth bits of each of the first through eighth Kasami sequences in set-1. The eight data bits generated for each address designated by the first presettable counter 420 are provided to a first 8-to-1 data selector 440 which selects the bit corresponding to the Kasami sequence designated by the three code select bits it receives, code shift key modulation. The selected bits are provided to a first mixer 450 to phase-shift key modulate the first subcarrier after being level shifted by level shifter 447 to make a bipolar code signal which results in an equal signal envelope for 0 and 1 bits.

The second presettable counter 425, second code storage ROM 435, and the second 8-to-1 data selector 445 operate substantially the same as the first presettable counter 420, first code storage ROM 430, and the first 8-to-1 data selector 440, respectively. One difference, however, is that the second code storage ROM 435 holds the set-2 Kasami codes. Another difference is that the output of the second 8-to-1 data selector 445 does not directly provide the selected bits to the second mixer 455. Instead, the series of bits generated by the 8-to-1 data selector is exclusive-ORed by the XOR gate 470 with the one PSK bit to command the second subcarrier to either lead or lag the first subcarrier. This is an easy method for controlling the phase relationship of the first and second subcarriers. Specifically, if the one phase bit is logic low, then the first subcarrier will continue to phase lead the second subcarrier, but if the one phase bit is a logic high, the net phase of the second subcarrier will change by 180 degrees thereby changing the phase relationship of the first subcarrier to phase lagging the second subcarrier. The output of the XOR gate 470 is multiplied with the second subcarrier in a second mixer 455 after being level shifted by level shifter 448 to make it bi-polar.

The two subcarriers having been modulated in the first and second mixers 450, 455 are then modulated independently in amplitude, each at one fixed level per message bundle by a first attenuator 460 and a second attenuator 470. The two subcarriers are then summed by adder 480 to generate the composite signal.

It merits discussion that the two subcarriers are provided in quadrature to conserve modulator peak power. If multiple subcarriers, such as tones in a multitone modem, are transmitted simultaneously at the same carrier frequency, they will typically beat causing a variation of the amplitude of the transmitted signal envelope. This requires that the transmitter's RF amplifier be capable of transmitting the summed signal when the subcarrier signals are in phase. Therefore, in an amplifier having limited peak output power, the addition of a second signal reduces the allowed power of the first signal by a factor of 4, not just 2. One way to avoid the coherent beating is to shift the second subcarrier by 90 degrees (an orthogonal subcarrier). Beating is also the reason for not allowing each subcarrier to have an independent FSK frequency offset since the phase of the two subcarriers would not be maintained at 90°, and the envelope of the signal would beat, which would again require the transmitter to be 6 dB more powerful in peak capacity.

Unfortunately, the orthogonality of the two subcarriers can not be used to isolate them upon reception at the demodulator. The various multipath time delayed replicas of the transmitted composite signal will have a random phase relationship with one another, therefore there can be no synchronous local oscillator phase that can demodulate all of the first subcarrier or second subcarrier without also allowing a large amount of the other subcarrier signal through the demodulator. So, the orthogonality of the set-1 and set-2 codes is used to discriminate between first and second subcarriers. Although it may appear that additional information could be encoded if each of the subcarriers were modulated by all of the sixteen available Kasami sequences, the two subcarriers could not be distinguished effectively at demodulation.

Figure 8:
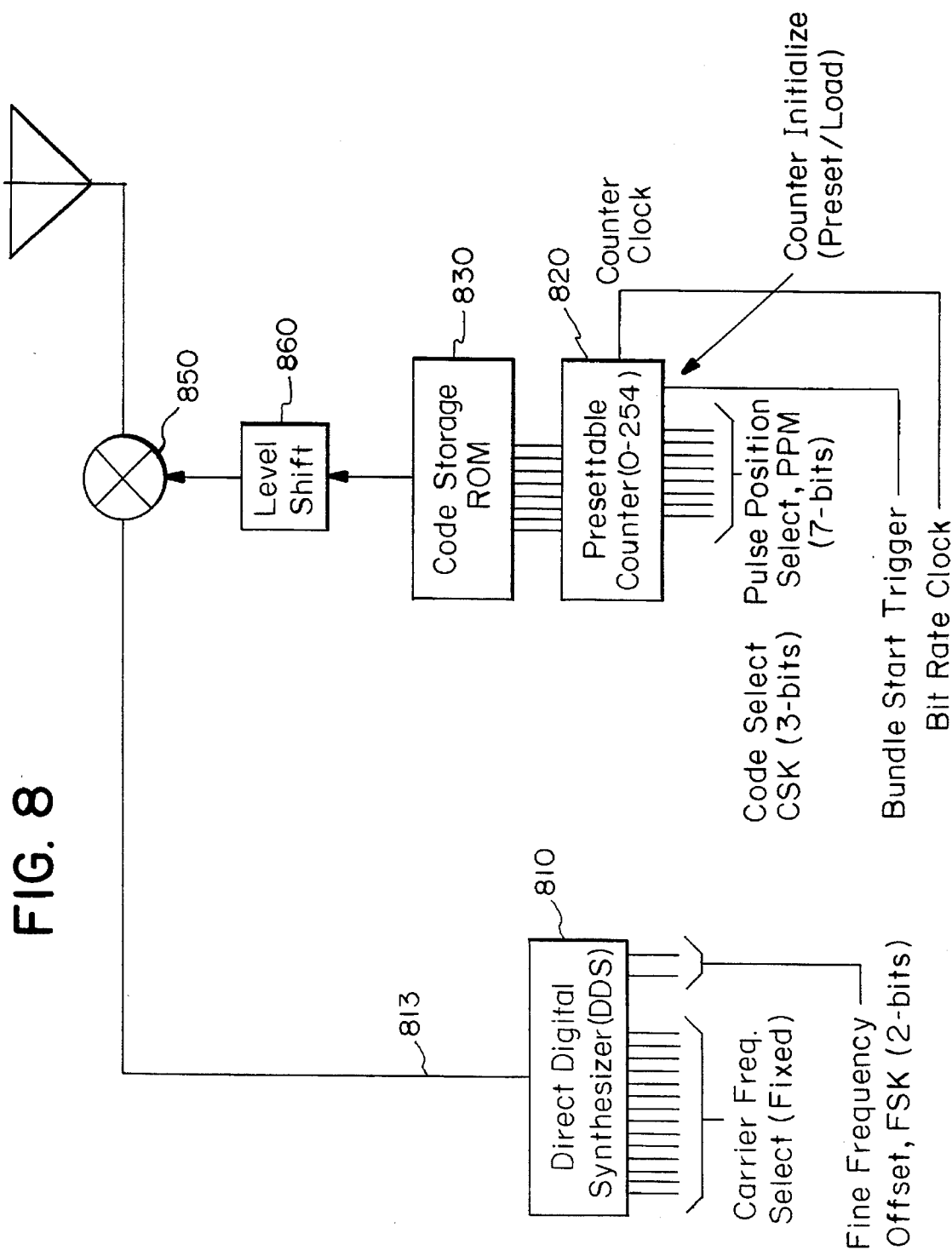
FIG. 8 illustrates a schematic diagram of an alternative embodiment for the modulator.

One alternative embodiment of the modulator is illustrated in FIG. 8. This embodiment generates a composite signal which only has a single subcarrier. This subcarrier is modulated by a single chipping sequence, the 255 bit maximal length sequence. A direct digital synthesizer 810 receives 2 bits of data every message bundle and generates a sinusoidal signal on output line 813 having one of four frequency offsets determined by the two FSK bits. A presettable counter 820 receives 7 bits defining the bit on which the maximal length sequence will start. These 7 bits are loaded into the counter's register in response to the message bundle start trigger signal received at a preset/load terminal of the counter 820. Upon receipt of this signal, the presettable counter 820 initiates counting up for every cycle of the bit rate clock. The count of the presettable counter 820 is used to address a code storage ROM 830 which stores the single maximal length sequence. The output of the ROM 830 is provided to a mixer 850 via a level shifter 860 where it phase modulates the sinusoidal signal provided on line 813.

Figure 6:
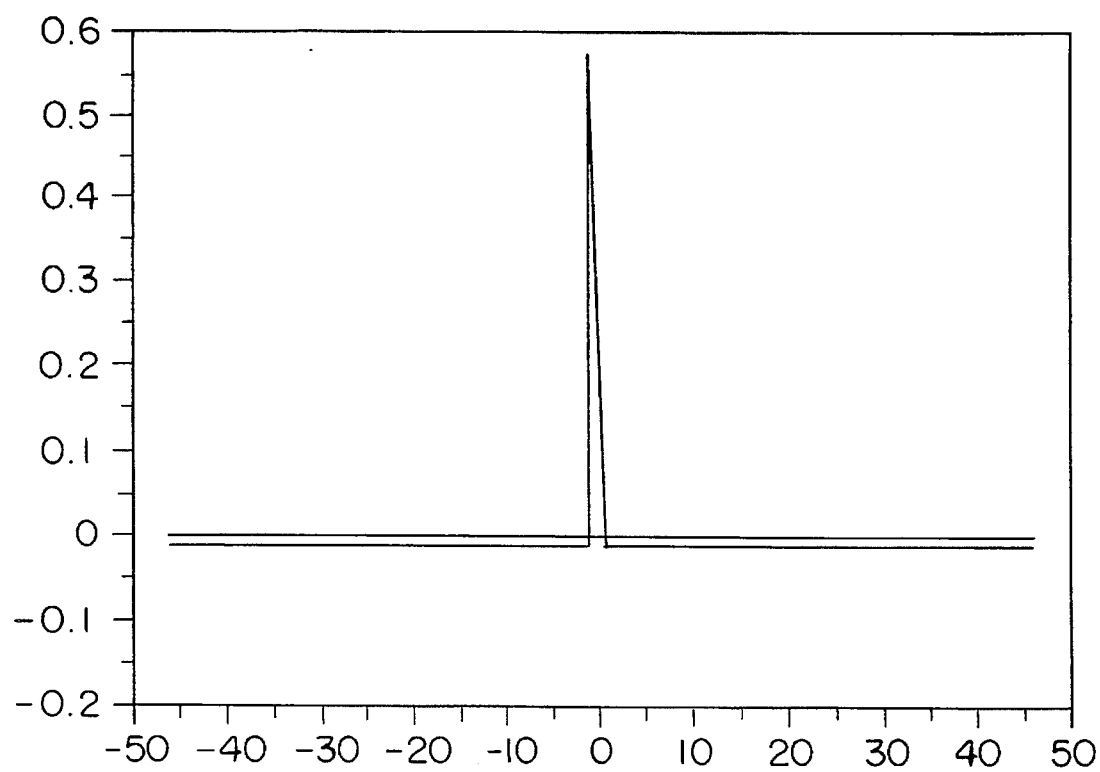
FIG. 6 illustrates the maximal length sequence autocorrelation function.

This alternative embodiment only encodes 9 bits per message bundle, 7 bits for the pulse position modulation and 2 bits for the frequency shift key modulation. The attractive feature, however, of this configuration is that the ideal auto correlation function for the maximal length sequence illustrated in FIG. 6 can be achieved. The spurious response in this function is 48 dB below the peak for 255-length codes while it is only 24 dB down fro the Kasami sequences. Since there is no data conveyed in the differential detection of the first message bundle, the use of this M-coded waveform for the first message bundle provides a much better measurement of time delays on the channel.

Demodulator

Figure 5B:
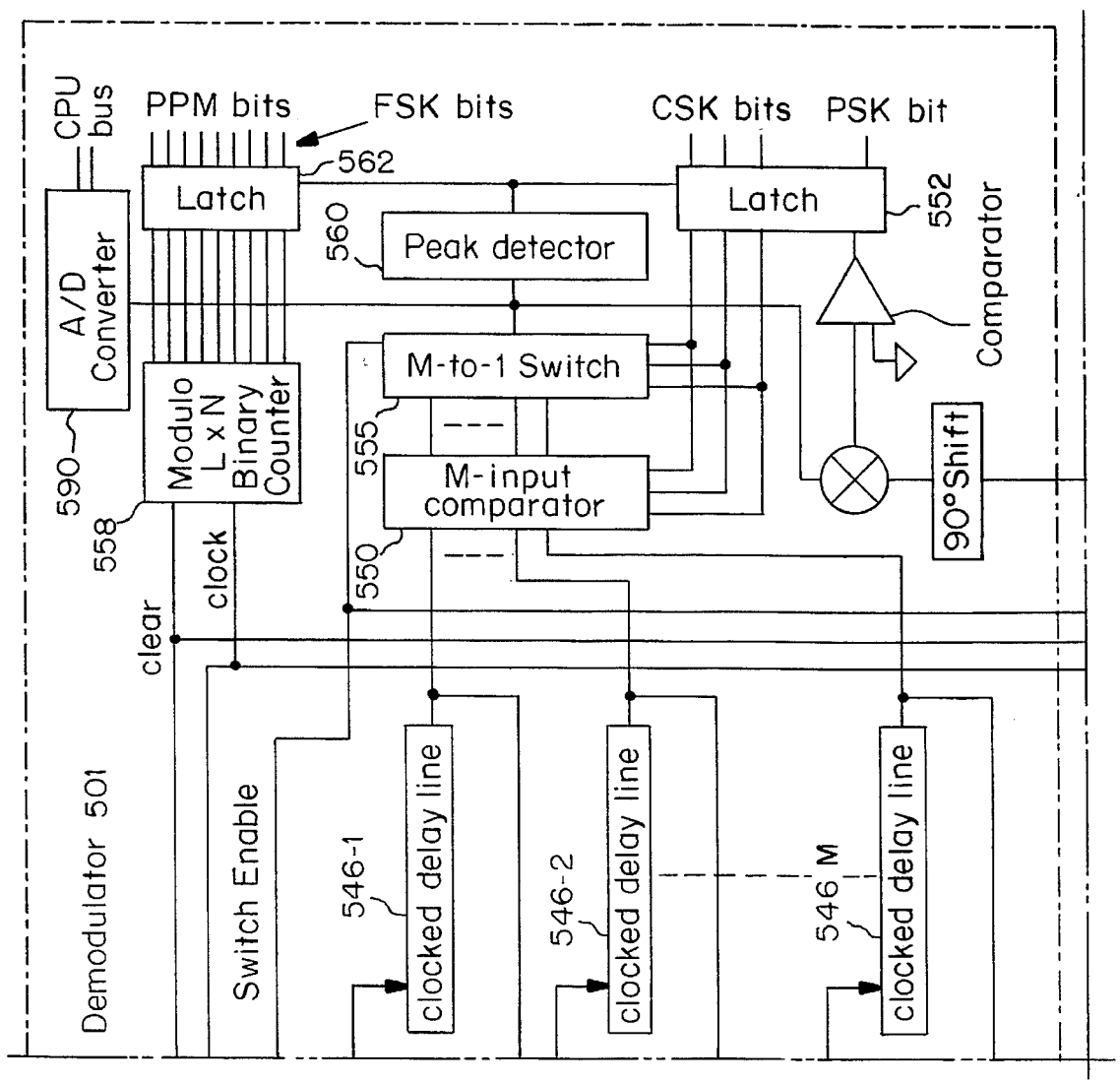
FIG. 5 is a schematic diagram for a demodulator for decoding the composite signal.
Figure 5C:
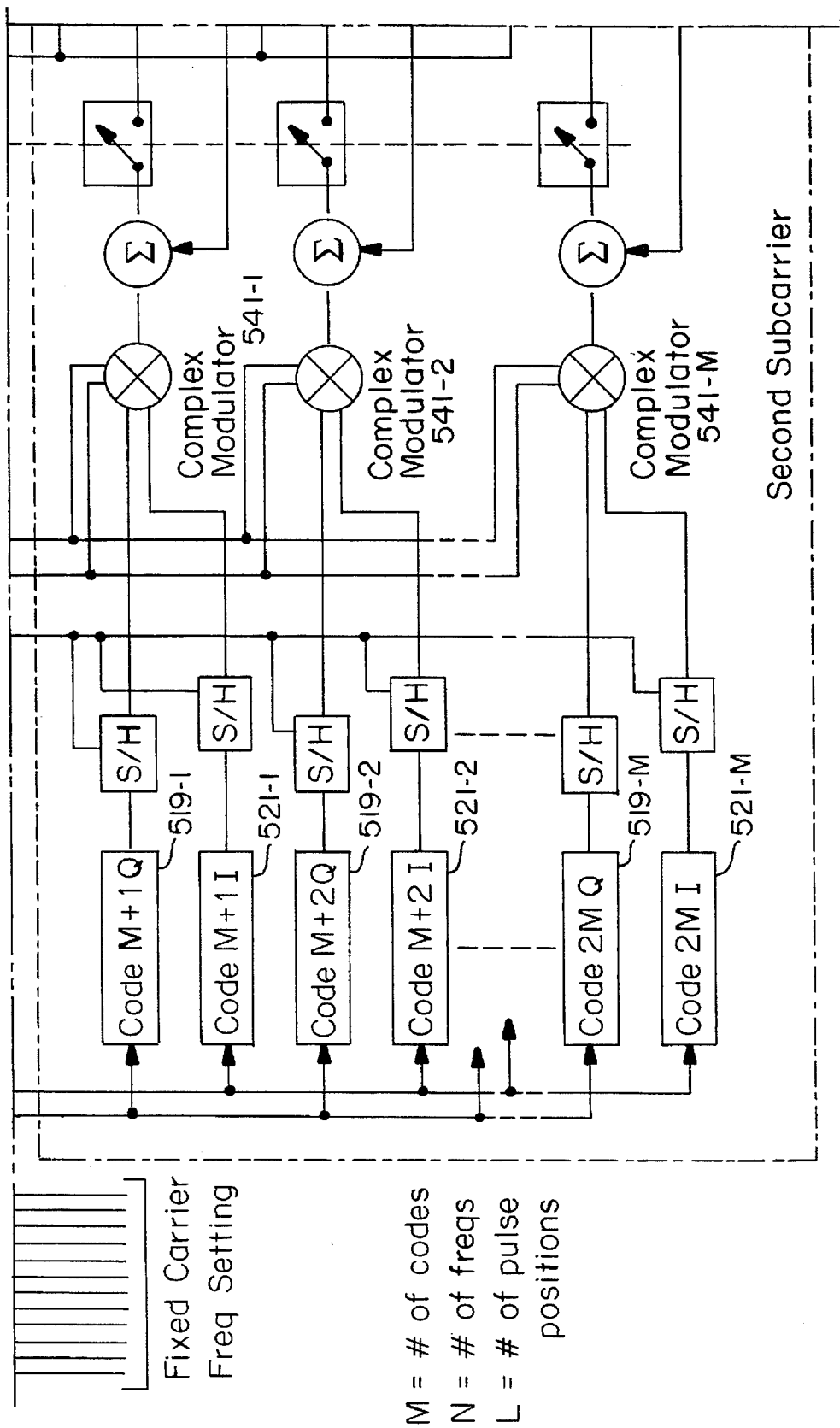
Figure 5D:
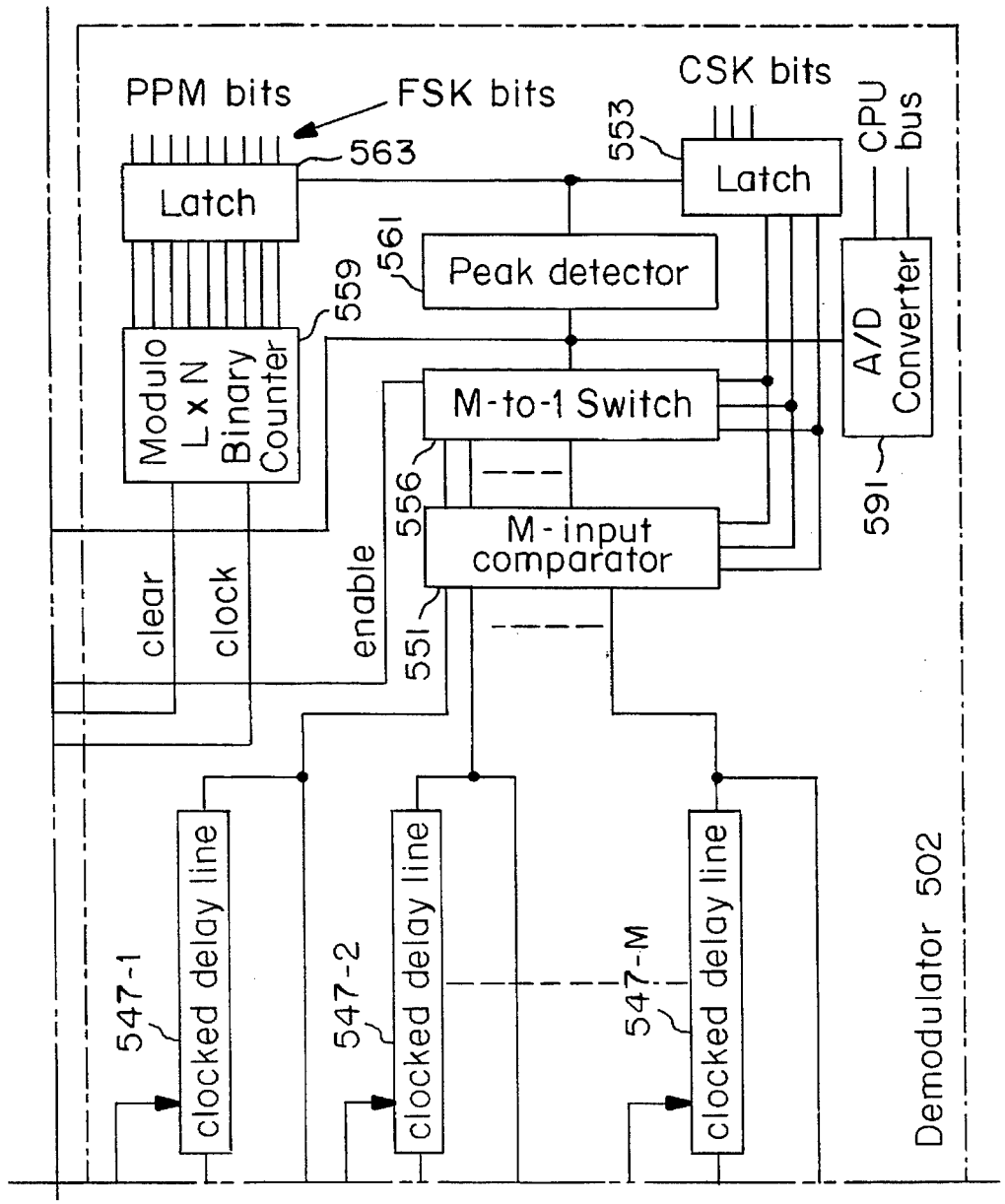

Referring now to FIG. 5, an inventive demodulator for decoding the composite signal is schematically illustrated. The encoding modulator, in FIG. 4, was depicted with fixed modulation parameters, namely a code length of 255, a 16 code orthogonal set, 4 possible frequency shifts, 4 possible amplitudes, and 128 of the 255 possible pulse position (time delay) shifts. The demodulator is described with general parameters, namely L for the number of pulse positions, M for the number of codes, and N for the number of frequency shifts. By replacing L with 255, M with 16, and N with 4, the decoding of the specific example depicted in FIG. 4 can be followed.

The demodulator of FIG. 5 is assumed to be embedded in a system with central processing unit CPU, which can set the desired receiver frequency, schedule the start of message reception and supply the timing signals "initialize" "bit clock" (at the spread spectrum chipping rate), and "bundle on" showing the approximate (within a fraction of one code repetitions interval) timing of the reception of transmitted bundles.

The mixers 510, 512 at the input serve to strip off the carrier signal and apply a quadrature phase offset to create I and Q channels by multiplication with the sinusoids generated by the frequency synthesizer 516 and the 90° shifter 514. This direct conversion to baseband is the simplest to illustrate, but for several practical reasons a multiple conversion heterodyne process may be implemented for which the following discussion is equally valid.

In the first subcarrier demodulator 501, the Q-Phase (Q) signal is applied to M matched filters 518-1 to 518-M programmed with M set-1 codes. The In-phase (I) signal is similarly provided to M matched filters 520-1 to 520-M programmed with the same set-1 codes. These matched filters could be implemented as a weighted tapped delay line, or transversal filter as shown in the figure, or of course, this and the other functions shown in the diagram could be performed digitally.

For any given message bundle, only one Kasami sequence per subcarrier is transmitted, but since the signal may be very weak detection of the transmitted sequence must be delayed until all the signal processing, including the pulse compression and Doppler integration, has been applied. The output of the matched filters occurs as a function of time, i.e., the pulse compressed signal pours out with the more delayed multipath components following the less delayed. At the bit rate or chipping rate, the pulse compressed I and Q signals from the matched filters are frozen and held by sample and hold amplifiers S/H. While each sample is held constant, it is multiplied in multipliers 540-1 to 540-M by N different complex sinusoidal samples from the sine table 534 and the cosine table 538 as sequenced by the xN clock signal generator 535. The resultant product is one sample of a Discrete Fourier transform DFT integration, i.e. one of the terms of the following equation.

$$F(k) = \sum_{i=0}^{N} s(i) \exp\left[ j \frac{2\pi k i}{N} \right]$$

where $\exp[j\alpha] = \cos(\alpha) + j\sin(\alpha)$, and $s(i)$ represents the received complex signal, comprised of both I and Q samples. The products of the multipliers 540-1 to 540-M are complex values but from here on, through the clocked delay line, and detectors, the complex signal will be shown as one signal flow line.

Each N successive products from the multipliers 540-1 to 540-M are clocked into a respective one of the clocked delay lines 546-1 to 546-M. These groups of N samples in the clocked delay line represent Doppler components at the same range or time delay. When the same time delay is sampled during the next code repetition this product ($s(i) \exp[j2\pi ki/N]$ in equation [1]) will be summed by the complex adders Σ with the accumulated products from the previous code repetitions, thus integrating the Doppler components.

The "bundle on" signal must be held low for one code repetition per bundle, which should coincide with the code repetition which contains the multipath contamination from the previous bundle and applies the zero coefficient of the windowing function. Each clocked delay line is thus cleared of the accumulated sums prior to commencing the new integration for the next message bundle, by means of the switch opening. This "bundle off" signal enables the selection of the maximum contents of the clocked delay lines to be routed into the peak detector.

After the last product from the last code repetition of a given bundle is shifted into the clocked delay lines 546-1 to 546-M, the delay line will hold a linear array of Doppler spectra at successively longer range or time delay bins. This linear array is hereafter referred to as the "Range/Doppler array". While the "bundle on" signal is low, the range/doppler array is clocked out the end of the delay line at the bit rate xN, while zeros are clocked into the input, but while "bundle on" is high the delay line outputs are summed with the new Fourier products to be circulated and accumulated N times during the message bundle.

The detection is accomplished by presenting all of the first subcarrier demodulator 501 clocked delay line outputs to an M-input binary comparator 550, to determine which of the M codes has the largest peak at each time delay shift. The comparator 550 selection results in a binary output indicating which signal is largest. The identity of the delay line which is providing the maximum output at the time of arrival of the maximum indicates the code selection or CSK bits of the message which are latched in latch 552. These bits are also used by the M-to-1 switch 555 to conduct the maximum correlator output signal to the peak detector 560. The peak detector 560 will output pulses, of pulse width equal to 1/N*bit_rate, whenever the clocked delay line output is larger than the previous maximum until the maximum signal of the bundle is detected. The position of these peaks in the Range/Doppler array is indicated by the modulo LxN counter 558 with the lower bits providing the frequency information and the upper bits providing the pulse position. These pulses will latch the detected frequency offset, time delay offset and code selection bits into the output latches 552 and 562. Therefore, the data is only valid after all the correlator results have been clocked out, such as at the rise of the next "bundle on" signal.

It should be noted that the LxN counter 558 (e.g. for L=255 and N=8 this is a modulo 2040 counter) returns to the same count with each code repetition and each bundle repetition. Therefore shifts in frequency offset (FSK) or time delay offset (PPM) can be detected simply by comparing the count at successive bundles. This determination is performed by the CPU under software control. Many synchronization schemes are possible but for illustration simply subtracting each successive count from the previous one will detect these shifts differentially, thus losing the message capacity (except for the CSK bits) of the first bundle.

Since it was specified that the chipping sequence is modulated onto the RF carrier with a linear modulation, the amplitude of the received correlation peak varies linearly with the signal amplitude. Therefore, the amplitude read in from the A/D converters provides the CPU with a means of determining the ASK bits.

Although not specifically described, the second subcarrier demodulator 502 operates identically to and independently from the first subcarrier demodulator 501 described above. Since the same frequency shift is applied to both subcarriers of the transmitted signal, as discussed earlier, the same frequency offset should be detected in both subcarrier demodulators 501, 502. This can be used as a check on the presence and quality of the received signal. The PPM and CSK bits can be different from those encoded on the first subcarrier, and the PSK bit is defined relatively between the two subcarriers, thus the two subcarrier signals can carry nearly twice the information content of one subcarrier.

Now, the PSK bit can be decoded by providing the selected maximum Doppler line to the multiplier 590. If the second subcarrier amplitude (one element of the correlator output) is shifted 90°, the two phases presented to the multiplier 590 will be either in-phase or anti-phase, thus the multiplier 590 will produce either a positive or a negative output, which is then detected by the comparator 592, referenced to 0 Volts, to produce a digital output bit also latched by latch 552.

Figure 7B:
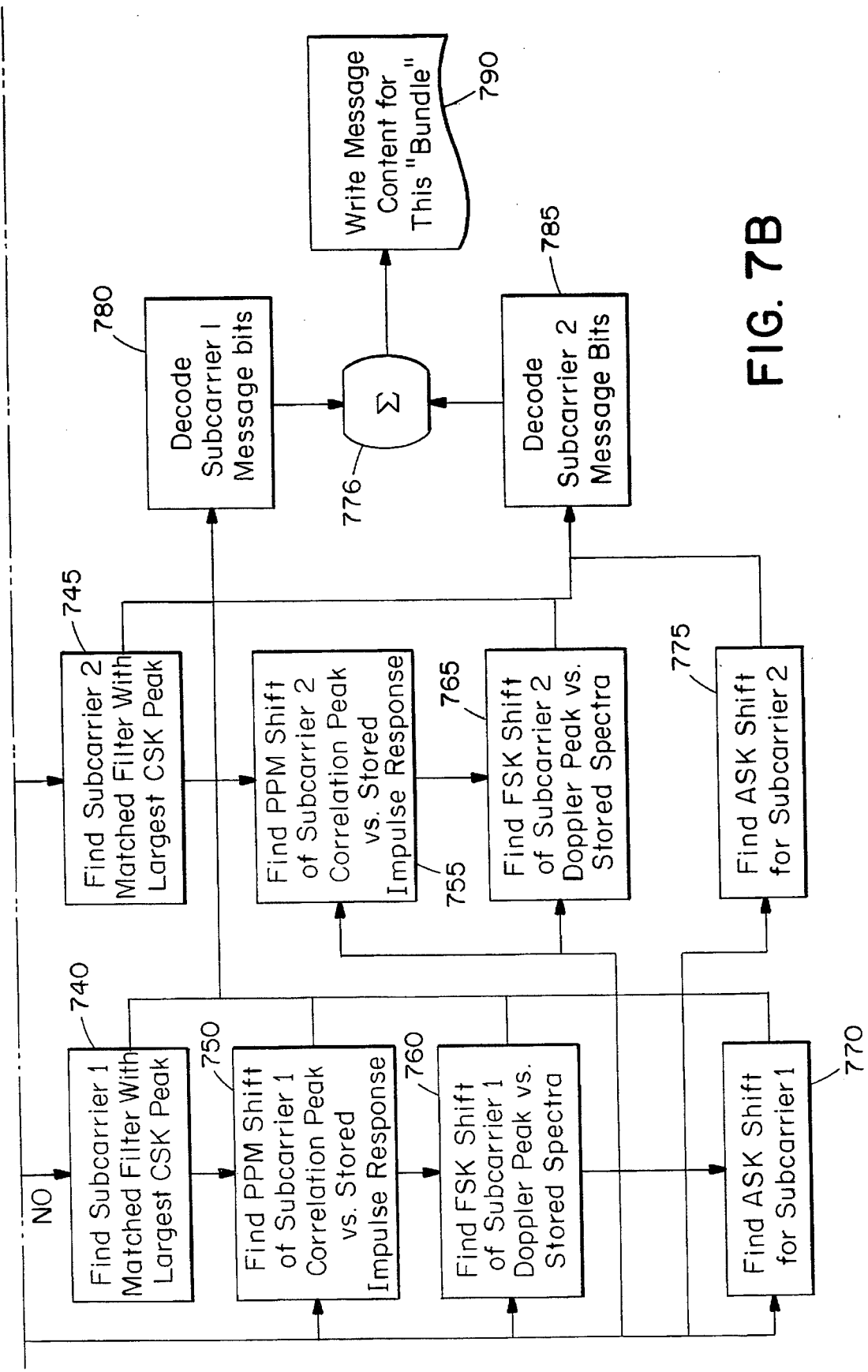
FIG. 7 illustrates the method for decoding the composite signal.

Depending on the type of channel being used, additional intelligence may be necessary to reliably decode the message bits; therefore, analog-to-digital converters 590, 591 are supplied to make a digital record of the Range/Doppler array complex amplitudes, i.e. amplitude and phase. With the current record plus that from the previous bundle, the time and frequency shifts can be detected in complicated fading multipath situations by cross correlating these impulse response records, thereby avoiding being misled by time delay or Doppler peaks which vary in amplitude from bundle to bundle. The A/D converter can allow the function of the peak detector and PSK comparator circuits to be replaced by digital processing and could in fact be placed at any point upstream in the processing, all the way to the receiver input whereby the various signal processing steps can be emulated in software. Therefore, the salient features of the demodulator can also be represented as a process, rather than an apparatus, as depicted in the flow diagram of FIG. 7.

In the software solution, the transmitted composite signal is received by antenna 705 in step 710. This received signal is pulse compressed in step 715 by two parallel banks of 2M matched filters to create the I and Q impulse responses for each subcarrier. The first bank of 2M matched filters is matched to the set-1 Kasami sequences; the second bank is matched to the set-2 Kasami sequences. Then, in step 720, a digital Fourier transform integration is performed to generate the Doppler spectrum for each possible Kasami sequence, pulse position, and matched filter. In step 725, it is determined whether this is the first bundle in the message. In the case of the first bundle, the Doppler spectrum for every delay is stored in step 730. Otherwise, the matched filter with the largest code shift key peak is determined for each of the two subcarriers in steps 740 and 745. In steps 750 and 755, the pulse position modulation shift is determined for each of the first and second subcarriers by comparing the respective correlation peak with the stored impulse response. Then, the frequency shift key shift for each of the two subcarriers is determined by comparing the Doppler peak with the stored spectrum for each subcarrier in steps 760 and 765. Finally, in steps 770 and 780, the ASK shift is determined by each subcarrier by comparing the magnitude of the correlation peaks. Thereafter, the contents of the message bundle are generated by decoding the message bits for each of the first and second subcarrier and summing these two sets of bits in steps 780, 785, and 790.

Utility

The above described composite signal is useful for conveying information between a transmitter and a receiver. The above-described modulator is useful for generating that composite signal whereas the above-described demodulator is useful for demodulating the composite signal.

Equivalents

Those skilled in the art will know or be able to ascertain using no more than routine experimentation, many equivalents to the specific embodiments of the invention described herein.

These and all other equivalents are intended to be encompassed by the following claims.

I claim:

1. A method of transmitting information by generating a spread-spectrum modulated signal and transmitting the signal over a communications link, the method comprising:

determining selected chipping sequences from a plurality of possible chipping sequences for message bundles in response to data to be transmitted;

determining starting positions of said selected chipping sequences in response to data to be transmitted;

modulating a carrier signal with the selected chipping sequences and beginning the selected chipping sequences at the starting positions to perform simultaneously code shift key modulation and pulse position modulation for the message bundles; and repeating at least a portion of said selected chipping sequences beginning at the starting positions in every message bundle for at least as long as multipath delays over the communications link.

2. A method as claimed in claim 1, further comprising transmitting another carrier in phase quadrature with the first carrier, the second carrier being modulated by a second plurality of possible chipping sequences, said second plurality of possible chipping sequences being orthogonal to the first plurality of possible chipping sequences.

3. A method as claimed in claim 1, further comprising: determining amplitudes of the carrier signal in response to data to be transmitted; and modulating an amplitude of the carrier signal in response to the determined amplitudes for the message bundles.

4. A method as claimed in claim 1, further comprising repeating the selected chipping multiple times to allow detection of small frequency offsets by means of spectral analysis of repeated correlation peaks at a receiver.

5. A method as claimed in claim 1, further comprising inducing frequency shifts in said carrier for message bundles in response to said data to be transmitted, thereby further performing frequency shift key modulation.

6. A method for transmitting information across a communications link by generating a spread-spectrum modulated signal temporally divided into message bundles, said method comprising:

generating a first modulated subcarrier by linearly modulating a first subcarrier with a first selected chip sequence being a pseudo-random sequence of plural bits in which starting positions of the transmission of the first selected chip sequence for each message bundle between a first through last bit are determined in response to data to be transmitted, wherein said first selected chip sequence is one of a first plurality of mutually orthogonal chip sequences chosen in response to data to be transmitted;

generating a second modulated subcarrier by linearly modulating a second subcarrier with a second selected chip sequence being a pseudo-random sequence of plural bits in which starting positions of the transmission of the second selected chip sequence between a first through last bit are determined in response to data to be transmitted, wherein said second selected chip sequence is one of a second plurality of mutually orthogonal chip sequences chosen in response to data to be transmitted;

generating a combined signal by combining said first modulated subcarrier and said second modulated subcarrier in phase quadrature; and inducing frequency shifts in said combined signal corresponding to one of a plurality of frequencies in response to data to be transmitted.

7. A method as claimed in claim 6, further comprising repeating at least a portion of said first and said second selected chip sequences for each message bundle so that all multipath components will be simultaneously present at a receiver for a time corresponding to at least one full repetition of the first and second selected chip sequences.

8. A method as claimed in claim 6, wherein a relative phase shift of said first modulated subcarrier and said second modulated subcarrier is determined in response to data to be transmitted.

9. A method as claimed in claim 6, wherein the frequency shifts are on the order of a few to tens of Hertz.

10. A method as claimed in claim 7, further comprising repeating the entire first and second selected chip sequences multiple times to allow detection of small frequency offsets by means of spectral analysis of repeated correlation peaks at a receiver.

11. A method as claimed in claim 7, further comprising determining the frequency shifts means by spectral analysis of repeated correlation peaks.

12. A method for demodulating a spread-spectrum modulated signal to receive transmitted information, said method comprising:

cross-correlating a received chip sequence of the spread-spectrum modulated signal with a plurality of possible chip sequences each beginning at a predetermined bit;

determining to which one of said plurality of possible chip sequences said received chip sequence corresponds;

determining a time delay until a correlation peak is generated;

determining a frequency shift in a frequency of the spread-spectrum modulated signal; and decoding said time delay, said received chip sequence, and the frequency shift as transmitted information.

13. A method as claimed in claim 12, wherein the step of determining the frequency shift comprises decoding a frequency shift in message bundles of said transmission by performing a full spectral integration and determining into which of a plurality of Doppler bins a peak of in the received Doppler spectra falls by cross correlation with a Doppler spectrum of previous message bundles.

14. A method as claimed in claim 12, further comprising detecting plural repetitions of said received chip sequence for message bundles to ensure that all multipath components of said spread-spectrum modulated signal are available for coherent integration of the entire received chip sequence.

15. A method as claimed in claim 13, wherein the frequency shift is on the order of a few to tens of Hertz.

16. An apparatus for transmitting information over a communications link, the apparatus comprising:

a synthesizer for generating a carrier signal;

a modulator for spectrally spreading said carrier signal with a selected chipping sequence, information being encoded into said carrier signal by determining said selected chipping sequence from a plurality of possible chipping sequences and determining a start bit among the bits comprising said selected chipping sequence for each message bundle, the modulator further repeating at least a portion of said selected chipping sequence beginning at the start bit in every message bundle for at least as long as multipath delays over the communications link; and a transmitter for transmitting the modulated carrier signal over the communications link.

17. An apparatus as claimed in claim 16, further comprising an amplifier for modulating an amplitude of the modulated carrier signal transmitted over the communications link for each message bundle.

18. An apparatus for transmitting information over a communications link, the apparatus comprising:

a synthesizer for generating a carrier signal a modulator for phase shift key modulating said carrier signal by a selected chipping sequence, information being encoded into said carrier signal by determining the selected chipping sequence from a plurality of possible chipping sequences and by determining a start bit among the bits comprising said selected chipping sequence for each message bundle; and a modulator for modulating a frequency of said carrier signal encode information.

19. An apparatus as claimed in claim 18, further comprised of said modulator selecting said chipping sequence from a plurality of mutually orthogonal sequences in response data to be modulated.

20. An apparatus as claimed in claim 18, wherein the frequency modulator modulates the frequency of the carrier signal on the order of a few to tens of Hertz.

21. An apparatus for transmitting information over a communications link, the apparatus comprising:

a synthesizer for generating a first subcarrier and a second subcarrier in phase quadrature;

a first modulator for phase shift key modulating said first subcarrier by first chipping sequences selected from a first set of orthogonal sequences, the first modulator including a first selector for selecting a start bit among the bits comprising said first chipping sequences for each message bundle;

a second modulator for phase shift key modulating said second subcarrier by second chipping sequences selected from a second set of orthogonal sequences, each one of said chipping sequences of said first set being orthogonal to every chipping sequence of said second set, the second modulator including a second selector for selecting a start bit from among the bits comprising said second chipping sequences for each message bundle;

an adder for combining the modulated first subcarrier and the modulated second subcarrier to generate a composite signal; and a frequency modulator for modulating a frequency of the composite signal.

22. An apparatus as claimed in claim 21, further comprising:

a first amplitude modulator for amplitude modulating said first subcarrier; and a second amplitude modulator for amplitude modulating said second subcarrier.

23. An apparatus as claimed in claim 21, further comprising means for modulating a phase relationship between said first subcarrier and said second subcarrier.

24. An apparatus as claimed in claim 22, further comprising means for modulating a phase relationship between said first subcarrier and said second subcarrier.

25. A demodulator for receiving information over a communications link contained in a spread-spectrum signal, the demodulator comprising:

a filter for cross-correlating a received chipping sequence with a plurality of possible chipping sequences each beginning at a predetermined bit;

a comparator for determining to which one of said plurality of possible chipping sequences said received chipping sequence corresponds;

a delay detector for determining a time delay until a correlation peak is generated by said filter relative to a received chipping sequence beginning at the predetermined bit; and a frequency detector for determining a frequency of the spread-spectrum signal;

a decoder for decoding said time delay, said received chipping sequence, and the frequency as transmitted data.

26. A demodulator as claimed in claim 25, wherein the frequency detector performs a full spectral integration of repeated correlation peaks and determines into which of a plurality of Doppler bins a peak of a received Doppler spectra falls by cross correlation with a Doppler spectrum of previous message bundles.

27. A demodulator as claimed in claim 25, further comprising an amplitude detector for determining an amplitude of the spread-spectrum signal; the decoder further decoding the detected amplitude as transmitted data.

28. A demodulator as claimed in claim 25, wherein the frequency detector detects changes the frequency on the order of a few to tens of Hertz.

29. A method transmitting information by generating a spread-spectrum modulated signal and transmitting the signal over a communications link, the method comprising:

determining selected chipping sequences from a plurality of possible chipping sequences in response to data to be transmitted;

determining starting positions of the selected chipping sequences in response to data to be transmitted;

determining frequency shifts in response to data to be transmitted;

modulating a carrier signal with the selected chipping sequences, beginning the selected chipping sequences at the starting positions, and modulating a frequency of the carrier signal in response to the determined frequency shifts to perform simultaneously code shift key modulation, pulse position modulation, and frequency shift key modulation.

30. A method as claimed in claim 29, further comprising repeating at least a portion of said selected chipping sequences beginning at the starting positions in every message bundle for at least as long as multipath delays over the communications link.

31. A method as claimed in claim 29, further comprising: determining an amplitude of the carrier signal in response to data to the transmitted; and amplitude modulating the carrier signal in response to the determined amplitude to further perform amplitude shift key modulation.

32. A method as claimed in claim 29, wherein the carrier signal is phase shift key modulated in response to the selected chipping sequences.

* * * * *